United States Patent [19]

Stewart, Jr.

[11] 3,829,835

[45] Aug. 13, 1974

[54] MULTI-SIGNAL ENCODER AND TRANSPONDER

[75] Inventor: Victor E. Stewart, Jr., South Milwaukee, Wis.

[73] Assignee: McGraw-Edison Company, South Milwaukee, Wis.

[22] Filed: Sept. 20, 1972

[21] Appl. No.: 290,513

Related U.S. Application Data

[63] Continuation of Ser. No. 285, Jan. 2, 1970, abandoned.

[52] U.S. Cl. .................. 340/151, 340/150

[51] Int. Cl. .................. H04q 9/00

[58] Field of Search .................. 340/151

[56] References Cited

UNITED STATES PATENTS

| | | | |
|---|---|---|---|
| 2,719,284 | 9/1955 | Roberts | 340/151 R |
| 3,108,255 | 10/1963 | Lester | 340/150 R |
| 3,492,649 | 1/1970 | Polillo | 340/150 X |
| 3,609,691 | 9/1971 | Stewart | 340/151 R |
| 3,609,754 | 9/1971 | Riebs | 340/151 X |
| 3,675,237 | 7/1972 | Weinfurt | 340/151 X |

*Primary Examiner*—Harold I. Pitts

[57] ABSTRACT

A position encoder and transponder for use in an automatic remote meter reading system and including disc means coupled to the meter being read and perforated in accordance with a position code and position means having a plurality of photoresponsive information bit means operatively associated with the coded disc. An oscillator provides two different tone signals in accordance with associated capacitive parameters and capacitance means is associated with each photoresponsive means for being placed in a parallel circuit relation with the capacitive parameters in accordance with the position of the coded disc so that a different pair of tone signals will be provided for each disc position.

10 Claims, 5 Drawing Figures

PATENTED AUG 13 1974

3,829,835

SHEET 1 OF 3

Inventor:
Victor E. Stewart, Jr.
By: Richard C. Ruppin
Atty.

Inventor:
Victor E. Stewart, Jr.
By: Richard C. Ruggin
Atty.

| Pos | 48c | 48b | Oscillator 80 | | Oscillator 61 | | 48a | 48 | Pos |
|---|---|---|---|---|---|---|---|---|---|
| | C4 | C3 | Increment | Increment Capacitance | Increment | Increment Capacitance | C2 | C1 | |
| | 2nf | 1nf | | | | | 2nf | 1nf | |
| | Binary Code | | % | nf | % | nf | Binary Code | | |
| 0 | □ | □ | 1.17 | 3 | 1.17 | 3 | □ | □ | 0 |
| 1 | □ | □ | 1.17 | 3 | .78 | 2 | □ | • | 1 |
| 2 | □ | □ | 1.17 | 3 | .39 | 1 | • | □ | 2 |
| 3 | □ | • | .78 | 2 | .78 | 2 | □ | • | 3 |
| 4 | • | □ | .39 | 1 | 0 | 0 | • | • | 4 |
| 5 | □ | • | .78 | 2 | 0 | 0 | • | • | 5 |
| 6 | • | • | 0 | 0 | 0 | 0 | • | • | 6 |
| 7 | • | • | 0 | 0 | .39 | 1 | • | □ | 7 |
| 8 | • | • | 0 | 0 | 1.17 | 3 | □ | □ | 8 |
| 9 | • | □ | .39 | 1 | .78 | 2 | □ | • | 9 |
| 10 | □ | □ | 1.17 | 3 | 0 | 0 | • | • | 10 |
| 11 | □ | • | .78 | 2 | .39 | 1 | • | □ | 11 |
| 12 | • | • | 0 | 0 | .78 | 2 | □ | • | 12 |
| 13 | • | □ | .39 | 1 | .39 | 1 | • | □ | 13 |
| 14 | □ | • | .78 | 2 | 1.17 | 3 | □ | □ | 14 |
| 15 | • | □ | .39 | 1 | 1.17 | 3 | □ | □ | 15 |

Fig. 5.

Inventor:
Victor E. Stewart, Jr.
By: Richard C. Ruppin
Atty.

MULTI-SIGNAL ENCODER AND TRANSPONDER

REFERENCE TO RELATED APPLICATIONS

This application is a continuation of application Ser. No. 285 filed Jan. 2, 1970, now abandoned.

BACKGROUND OF THE INVENTION

This invention relates to a position encoder and, more particularly, to a device having more than one modulator for converting an analogue quantity representing the position of a shaft or other movable member into a digital quantity for transmission to a remote location.

Utility meters, such as electric, gas and water meters, are generally widely distributed at the customers' points of usage. It is the present practice in the reading of such meters for a meter reader to visit each customer's site and to observe and record the registration on each unit. While there has been a large number of proposals for the automatic reading of such meters from a remote location, they have not been commercially adapted because of their high cost and because they could not meet the limitations imposed by existing utility meters and communication systems. Such limitations include expense, a relatively confined space available for such encoding devices and the need for a signal format which meets available communication systems requirements and conforms to existing communication systems practice.

It is an object of the invention to provide an economical encoding and signal transmitting assembly.

Another object of the invention is to provide an encoding and signal transmitting assembly which may be incorporated into the relatively confined space such as may exist in a utility meter.

Another object of the invention is to provide an encoder and signal transmitter wherein a plurality of tone signals is used to represent a plurality of information bits.

Another object of the invention is to provide an encoder and signal transmitter for transmitting information from a single source in frequency division multiplex form.

Another object of the invention is to provide an encoder and signal transmitter wherein a plurality of information bits are represented by a plurality of signal levels having a small departure from a reference signal level.

Another object of the invention is to provide an encoder and signal transmitter wherein a plurality of information bits are represented by a plurality of frequencies having a small bandwidth.

A further object of the invention is to provide an encoder and signal transmitter for transmitting a plurality of information bits including incrementing means having a small number of increments and small total incremental change.

These and other objects and advantages of the instant invention will be apparent from the description of the preferred embodiment hereinbelow.

SUMMARY OF THE INVENTION

The objects of the invention are accomplished by providing a position encoder and transmitter including first and second relatively movable means each having a plurality of code means, one code means being an array of code elements and the other code means being a plurality of information bit means and circuit means including two modulators which are operable to produce variations in their output quantities in accordance with the magnitude of a circuit variable. A circuit variable modifying means is also provided and is associated with the other code means and separately coupled to each of the two modulators. The circuit variable modifying means provides a different combination of circuit variables and thus circuit variable magnitudes for the two modulators for each relative position of the code elements and information bit means. As a result, the two modulators will have a different combination of output quantities for each relative position of the code elements and the combined modulator output quantities represent information from the information bit means.

BRIEF DESCRIPTION OF THE DRAWINGS

FIG. 5 is a table illustrating an example of the code and tone transmitted by the encoder and transmitter illustrated in FIGS. 1–4.

DESCRIPTION OF THE PREFERRED EMBODIMENT

Figure 1:
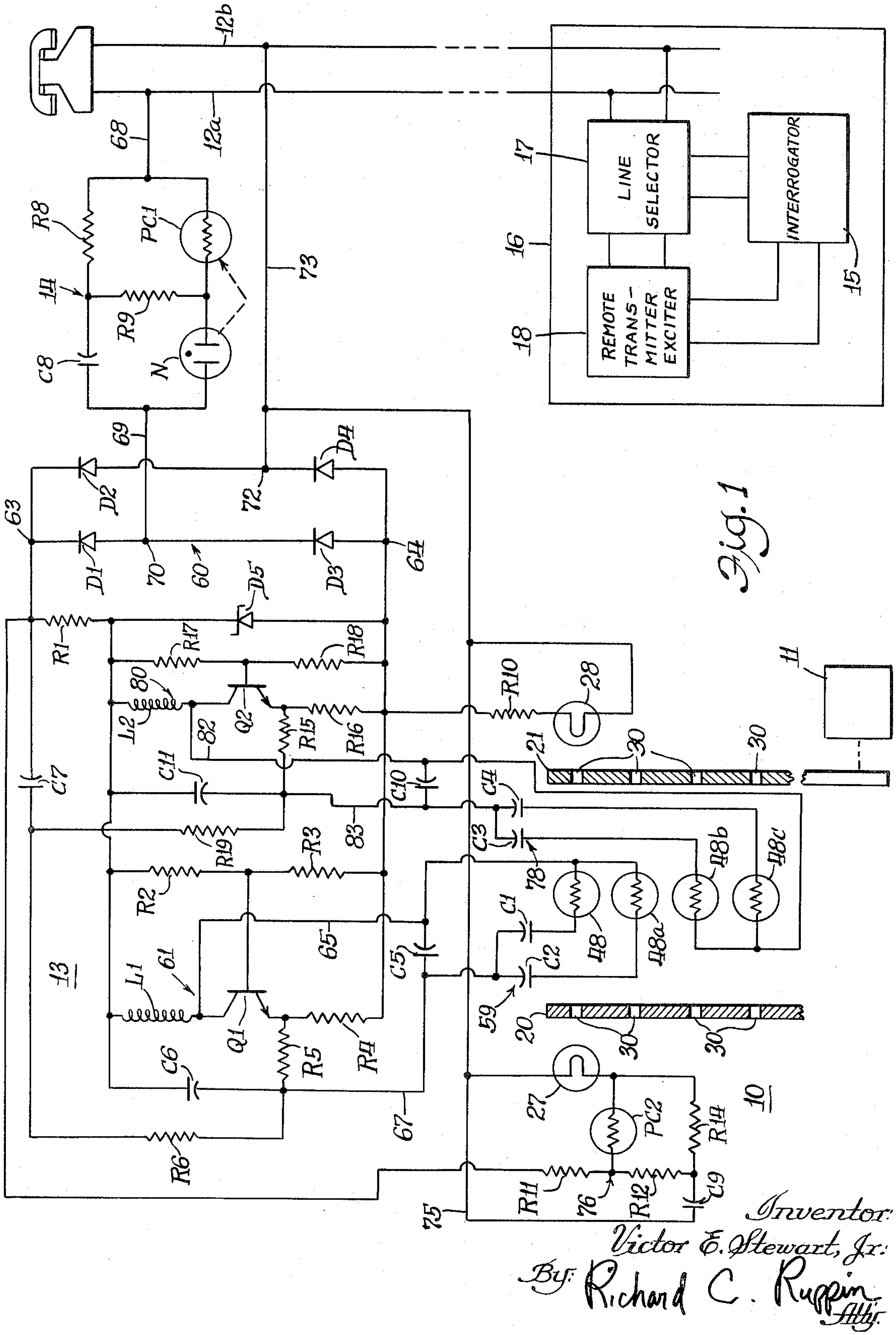
FIG. 1 shows a remote meter reading system incorporating the encoder and signal transmitter according to the instant invention.

FIG. 1 shows an automatic remote meter reading system in which an encoder 10 and a transmitter 13 according to the instant invention are employed. The encoder 10 is mechanically coupled to the meter 11 which is to be read and to the customers' telephone lines 12*a* and 12*b* through the transmitter 13 and a line coupler 14. An interrogator 15 at the telephone exchange 16 is coupled to the lines 12*a* and 12*b* through a line selector 17 and a remote transmitter exciter 18.

The details of the meter 11, the interrogator 15, the line selector 17 and the remote transmitter exciter 18 form no part of the instant invention and, accordingly, will not be discussed in detail. It is sufficient for purposes of understanding the instant invention to note that, when it is desired to read the meter 11, the interrogator 15 is actuated and in turn actuates the line selector 17 and the remote transmitter exciter 18. The remote transmitter exciter 18 then sends a signal through the lines 12*a* and 12*b* which actuates the line coupler 14, whereby the encoder 10 and the transponder 13 are actuated and coupled to the lines 12*a* and 12*b*. The encoder 10 provides the coded information relative to the registration of meter 11 to the transmitter 13, which, in turn, transmits the information to the interrogator 15. The transmitter 13 may take the form of one or more oscillators, and the encoder may change the parameters of the oscillating circuit as a function of the meter registration, whereby different tone signals will be placed on the lines 12*a* and 12*b* in accordance with the reading of meter 11.

Figures 2, 3, 4:
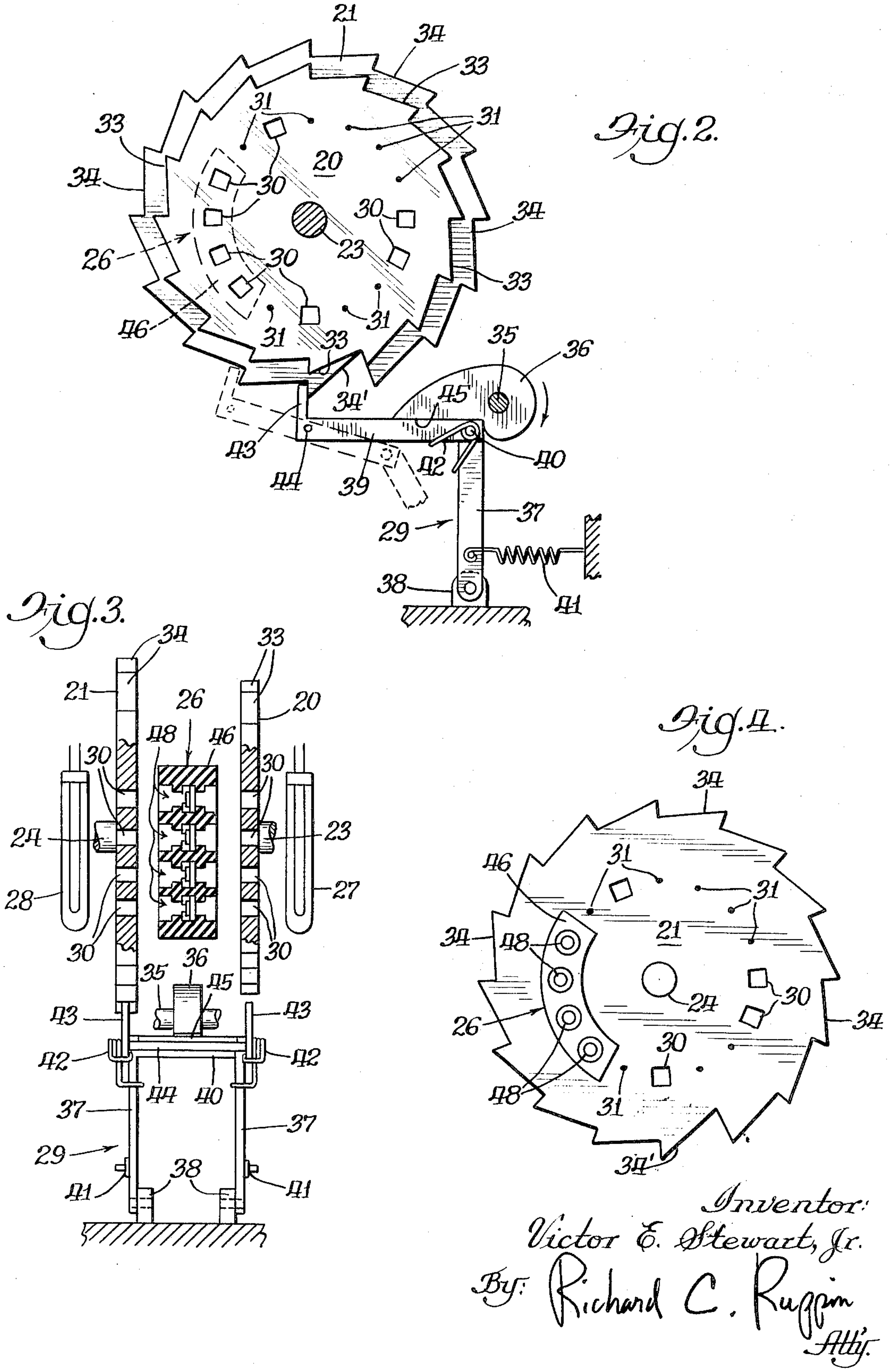
FIGS. 2, 3 and 4 illustrate a coded disc and information bit configuration useable with the instant invention.

FIGS. 2 and 3 show the preferred embodiment of the encoding device 10 in greater detail to include a pair of coded discs 20 and 21 which are respectively mounted for rotation about central shafts 23 and 24, a sensor assembly 26, a pair of lamps 27 and 28 and a drive assembly 29 for coupling discs 20 and 21 to the meter being read.

The discs 20 and 21 are provided with an array of coding elements or units. In the illustrated embodiment, wherein each of the discs 20 and 21 has 16 positions, 16 coding units are provided on each disc and a different group of coding elements are present at each position. Also, where the sensor assembly 26 is photosensitive, the coding units comprise holes or transparent positions 30 and unperforated opaque positions 31.

As seen in FIG. 2, the coding elements units 30 and 31 are arranged on the disc 20 in a substantially equally spaced circular array. A similar array of units 30 and 31 are arranged on the disc 21. As will be pointed out more fully hereinbelow, the arrangement of holes 30 and opaque positions 31 are such that, when used with at least a four unit sensor assembly 26, a different group of holes 30 and opaque positions 31 will be present and an unambiguous code will be provided for each of the 16 positions of the discs 20 and 21.

In addition, the outer periphery of each of the discs 20 and 21 is coupled to a drive assembly 29 which is operative to successively step the disc 21 through each of its 16 positions and then to advance the disc 20 one position for each revolution of the disc 21. The details of the drive assembly 29 form no part of the instant invention and, accordingly, will not be discussed in detail. One example of a drive mechanism capable of performing these functions is described in co-pending application Ser. No. 691,020, filed Dec. 15, 1967, and assigned to the assignee of the instant invention. It is sufficient for purposes of understanding the instant invention to note that the drive assembly 29 is coupled to the meter 11 and that it will step the disc 21 one position for each of a predetermined number of revolutions of the meter assembly 11.

As seen in FIGS. 2 and 3, the sensor assembly 26 comprises an opaque head 46 which is disposed between the discs 20 and 21 and in close parallelism thereto. When 16-position discs are provided, the sensor assembly 26 includes at least four sensor units or information bit means 48, **48*a*, 48*b* and 48*c*, which are spaced along the arcuate head 46 at the same distance as that between the coding units 30 and 31. The details of the sensor units 48–48*c* also form no part of the instant invention and, accordingly, will not be discussed in detail. It is sufficient for purposes of understanding the instant invention to note that each may comprise a photoresistive element which normally has a relatively high impedance and which changes to a low impedance state upon being illuminated. For a more complete description of sensor units 48–48*c*** which may be employed with the instant invention, reference is again made to said application Ser. No. 691,020.

The sensor units 48–**48*c* are arranged so that for each position of the discs 20 and 21 one of the sensor units will face one of the coding units 30 or 31 in a group of coding units in each of the discs 20 and 21. The lamps 27 and 28 are disposed adjacent the outer surfaces of each of the discs 20 and 21 and in an opposed relation to the sensor assembly 26. As will be pointed out more fully hereinbelow, the lamps 27 and 28 are connected to be sequentially energized so that the sensor units 48–48*c* will be selectively energized through the holes 30 in the disc 20 by light emitted from the lamp 27 and then from the opposite sides through holes 30 in disc 21 by light emitted from the lamp 28. The position code for the disc 20 will be determined by which ones of the sensor units 48–48*c* are energized when the lamp 27 is lit, and similarly, the position code for the disc 21 will be determined by which ones of the sensor units 48–48*c* are illuminated when the lamp 28 is lit. It will be understood that only those sensor units 48–48*c* which are opposite a hole 30 in the appropriate one of the discs 20 or 21 will be illuminated, while those adjacent an opaque position 31** will remain unenergized.

The drive assembly 29 includes a scroll cam member 36 which is fixed to a shaft 35 coupled to the meter being read. The cam 36 cooperatively engages a pawl assembly for stepping the discs 20 and 21 and which comprises a first pair of parallel links 37 having one end pinned at fixed pivot point 38 and a second pair of links 39 pivotally coupled to the other end of links 37 by knee pin 40. Spring 41 holds pin 40 in resilient engagement with the cam 36, and springs 42 urge clockwise rotation of links 39 to urge fingers 43 carried by their free ends into engagement with the teeth 33 and 34 on discs 20 and 21.

The diameter of the disc 21 is sufficiently greater than that of the disc 20 so that the radially outward extremity of disc 20 does not extend to the innermost portion of the teeth 34. As a result, one of the fingers 43 will engage the teeth 34 on disc 21, but the other finger 43 will normally be held out of engagement with the teeth 33 of disc 20 by a pin 44 which couples the ends of links 39. However, one of the teeth 34 on the disc 21, and designated 34, is deeper than the remaining teeth so that the teeth 33 on disc 20 will extend past its inner extremity.

As those skilled in the art will appreciate, the cam member 36 may be coupled to the meter by a gear drive (not shown) in such a manner that the cam member 36 will make one revolution for each of a predetermined number of revolutions in the meter assembly (not shown). As the cam member 36 rotates clockwise, as seen in FIG. 2, the links 37 and 39 are moved from their full to their phantom position wherein the finger 43 will move into engagement with the succeeding one of the teeth 34 on disc 21. As the cam member 36 completes one revolution, wherein its flat portion 45 is moved into engagement with the pin 40, the spring 41 will return links 37 and 39 to their full position, thereby moving the disc 21 one position in the counterclockwise direction. The disc 20 will remain stationary, however, because the other finger 43 will be held out of engagement with its teeth 33 by the larger outer periphery of the disc 21 and the pin 44.

After the disc 21 has completed one revolution wherein the tooth 34 is in a position to be engaged by the one finger 43, the greater depth of tooth 34 will allow engagement between the other finger 43 and one of the teeth 33 of the disc 20. In this manner, the disc 20 will be moved one position for each complete revolution of the disc 21.

If the position of the discs 20 and 21, as shown in FIGS. 2 and 3, is taken as the first position, each of the photosensitive units 48–**48*c*** will be illuminated when the lamps 27 and 28 are lit. As the discs 20 and 21 are stepped through each of their sixteen positions, a different arrangement of photosensitive units 48–48*c* will be illuminated to provide the sixteen-position unambiguous code shown in FIG. 5.

Reference is again made to FIG. 1 which illustrates how the sensor units are coupled to the transmitter 13. More specifically, the sensor units 48 and 48*a* are respectively coupled in series with capacitors C1 and C2, and the series combinations are connected in parallel with each other and with a capacitor C5. The sensor units 48*b* and 48*c* are respectively connected in series with capacitors C3 and C4, and the series combinations are connected in parallel with each other and with a capacitor C10. The numeral 59 designates an incrementing circuit which includes capacitors C1 and C2 and sensor units 48 and 48*a*. The numeral 78 designates another incrementing circuit which includes capacitors C3 and C4 and sensor units 48*b* and 48C.

The transmitter 13 may include a diode bridge 60 and oscillating circuits 61 and 80. The diode bridge consists of diodes D1, D2, D3 and D4 which are connected between the oscillating circuits 61, 80 and encoder 10, on the one hand, and the coupling circuit 14 on the other. When the coupling circuit 14 is active, a DC voltage will be supplied to the output terminals 63 and 64 of the diode bridge 60. A Zener diode D5 and a resistor R1 may be connected in series across the terminals 63 and 64 for providing a constant voltage to the oscillators 61 and 80.

Oscillator 61 includes an amplifier comprising a transistor Q1 and a first pair of resistors R2 and R3 which are connected in series across Zener diode D5 and their junction connected to the base of transistor Q1. A third resistor R4 is provided and is connected between the emitter of transistor Q1 and terminal 64. Oscillator 61 also includes a Colpitts feedback circuit consisting of an inductance L1 connected between the collector of transistor Q1 and the other terminal of resistor R2, and a first capacitor C6 connected between the other terminal of inductor L1 and by resistor R5 to the emitter of transistor Q1. Capacitor C5 constitutes a second capacitance in the Colpitts feedback circuit and is connected by conductors 65 and 67 and resistor R5 between the emitter and collector of transistor Q1. The incrementing circuit 59 is connected to the oscillator 61 such that the capacitors C1 and C2 are coupled in parallel with capacitor C5.

The transmitter 13 also includes a resistor R6 and a capacitor C7 which are connected in series between the terminal 63 and resistor R5. Capacitor C7 functions to decouple the emitter of transistor Q1 from terminal 63, and R6 desensitizes the oscillator output frequency to changes in the impedance of the lines 12*a* and 12*b*.

Oscillator 80 is identical in construction and operation to oscillator 61 and includes an amplifier comprising transistor Q2 and resistors R16, R17, and R18. The Colpitts feedback circuit of oscillator 80 comprises inductance L2, capacitor C11 and capacitor C10 connected between the emitter and collector of transistor Q2 througn resistor R15. The incrementing circuit 78 is connected to the oscillator 80 such that capacitors C3 and C4 are coupled in parallel with capacitor C10. Similarly to oscillator 61, capacitor C7 functions to decouple the emitter of transistor Q2 from terminal 63 and resistor R19 desensitizes the oscillator 80 output frequency to changes in the impedance of the lines 12*a* and 12*b*.

The coupling circuit 14 includes a photocell PC1 and a neon lamp N which are connected in series with each other and by conductors 68 and 69 between one of the customer lines 12*a* and one input terminal 70 of diode bridge 60. The coupling circuit also includes a resistor R8 and a capacitor C8 which are connected in series with each other between conductors 68 and 69. A second resistor R9 connects the junction between resistor R8 and capacitor C8 and the junction between photocell PC1 and the neon lamp N. The other terminal 72 of the diode bridge 60 is connected by conductor 73 to the other one of the customer lines 12*b*.

The normal telephone central office battery voltage applied to the lines 12*a* and 12*b*, which is in the order of 48 volts D.C., is insufficient to fire the neon lamp N so that the coupling circuit 14 is normally inactive and conductors 68 and 69 are effectively open circuited.

High dialing and ringing peak voltages, which may be in the order of 400 volts, are of insufficient duration to cause operation of the coupling circuit 14. When the remote transmitter exciter is actuated, however, a voltage of approximately 200 volts is applied between the lines 12*a* and 12*b*. As a result, sufficient charge will accumulate on capacitor C8 to break down the neon lamp N, causing the latter to illuminate the photocell PC1. This, in turn, causes the photocell PC1 to go from a high impedance state to a low impedance state, thereby connecting the conductors 68 and 69. As long as the input voltage signal is greater than the lamp breakdown voltage, lamp N will remain illuminated so that coupling circuit 14 will, in effect, remain latched in its conductive, or active, state.

Lamps 27 and 28 have a common terminal connected by conductor 75 to conductor 73. In addition, the other terminal of lamp 28 is connected to bridge output terminal 64 by resistor R10, and the other terminal of lamp 27 is connected to bridge output terminal 63 by an RC time delay circuit 76. The latter circuit includes resistors R11 and R12 and capacitor C9 which are connected in series between diode bridge terminal 63 and conductor 75. In addition, resistor R14 and photoresistor PC2 are connected to the other terminal of lamp 27 and to the junction between resistors R11 and R12 and between resistor R12 and capacitor C9, respectively.

When the photocells 48, 48*a*, 48*b* and 48*c* are not illuminated, they are in a high impedance state so that the capacitors C1, C2, C3 and C4 are effectively open circuited. When the capacitors C1, C2, C3 and C4 are open circuited, the oscillator 61 sees merely the capacitance of C5 and the oscillator 80 sees merely the capacitance of C10. When either of the lamps 27 and 28 is energized, only those photocells which are opposite the holes 30 will be illuminated and thereby go from the high impedance state to a low impedance state. Thus, those capacitors connected in series with an illuminated photocell and coupled in the circuit of oscillator 61 or oscillator 80 will be effectively connected in parallel with capacitor C5 or capacitor C10 so that the oscillator 61 or 80 sees a higher value of total capacitors. The capacitors C1, C2, C3 and C4 may have respective capacitances which are related such that any parallel circuit arrangement of capacitors C1 and C2 with capacitor C5 provides a different capacitive value than any circuit connection of capacitors C3 and C4 in parallel with capacitor C10 for each position of the discs 20 and 21. On the other hand, corresponding ones of the capacitors in the incrementing circuits 59 and 78, i.e., capacitors C1 and C3, and capacitors C2 and C4 may have the same values. For example, capacitors C1, C2, C3 and C4 may be 1nf, 2nf, 1nf and 2nf, respectively, as shown in FIG. 4 so as to provide the indicated parallel capacitance for each oscillator 61, 80 for each disc position.

As those skilled in the art will appreciate, the frequency of the oscillator 61 will be given by the expression:

$$f \cong 1/2\pi\sqrt{LC}$$

where $$C = 1/C6 + (1/C5 + C_n)^{-1}$$

and $C_n$ is the sum of those ones of the capacitances C1 and/or C2 that are connected in parallel with capacitance C5 as the result of their respective photocells 48 and/or 48*a* being illuminated through the holes 30 in the discs 20 or 21. As a result, the oscillator 61 will have a different output frequency for each position of the discs 20 and 21 which results in a different effective combination of capacitors C1 and C2 with capacitor C5. Furthermore, the frequemcy increment resulting from the different effective combinations of the capacitances C1 and C2, relative to the reference frequency of the oscillator 61, is given by the expression:

$$\text{Increment} = (f_R - f_\alpha)/f_R$$

where $f_R$ is the reference frequency and $f_\alpha$ is the frequency when capacitors C1 and/or C2 are effectively connected to oscillator 61. The same mathematical expressions state the frequency and frequency increment of oscillator 80 where the capacitances are C11, C10, C3 and C4 and the oscillator 80 has a different output frequency for each position of the discs 20 and 21 which results in a different effective combination of capacitors C3 and C4 with capacitor C10. The table of FIG. 5 shows the Increment values in terms of percent of the reference frequencies of oscillators 61 and 80. It may be noted that there are only three Increments, 0.39, 0.78 and 1.17 percent respectively corresponding to capacitive increments of 1nf, 2nf and 3nf.

Assume that a reading of the meter 11 is to be taken. The interrogator 15 is actuated and this, in turn, actuates the remote transmitter exciter and the line selector which selects the particular customer lines 12*a* and 12*b*. The remote transmitter exciter 18 places a positive potential signal on the line 12*a* and a negative potential signal on line 12*b*. Capacitor C8 will charge to a sufficiently high voltage to break down the neon lamp N. This illuminates the photocell PC1 which then changes from a high impedance state to a low impedance state, whereby current may continue to flow to lamp N. With the photocell PC1 in its low impedance state, the lamp N will remain illuminated as long as the voltage signals appear in the customer lines 12*a* and 12*b*.

The diode bridge 60 performs the function of signal receiving and mode selection. More specifically, the bridge 60 receives the actuating signals from the remote transmitter exciter 16 and selects which of the lamps 27 and 28 will be energized so that the discs 20 and 21 may be selectively read.

When the coupling circuit becomes active, voltage appears across the diode bridge output terminals 63 and 64 which energizes the oscillator 61 and 80. In addition, this voltage, less the small drop across diode D4, appears across the lamp 27 time delay circuit 76, which momentarily prevents lamp 27 from illuminating. The voltage across lamp 28 will be that across the diode D4, and this will be insufficient to break the lamp down. Initially, therefore, only capacitors C5 and C6 will be in the oscillator 61 circuit and only capacitors C10 and C11 will be in the oscillator 80 circuit. Accordingly, two reference frequency signals will be simultaneously placed on the lines 12*a* and 12*b* and received by the interrogator 15. After a time delay determined by the values of resistance and capacitance in the time delay circuit 76 and the lamp breakdown voltage, the lamp 27 will be illuminated and predetermined ones of the photocells 48, 48*a*, 48*b* and 48*c* will be activated in accordance with the position of the disc 20. This will modify the capacitances seen by the oscillators 61 and 80, and, accordingly, a second frequency signal from oscillator 61 and a second frequency signal from the oscillator 80 will be simultaneously applied to the lines 12*a* and 12*b* to indicate the position of the disc 20.

It will be appreciated that the second frequency signal of each of the oscillators 61 and 80 will be some increment below that of the first or reference frequency signal of each of the oscillators. By thus reading the disc position as a predetermined variation or percentage of the two simultaneously applied reference frequencies, rather than as the sum of two discrete frequencies, variations in capacitive values as the result of aging, for example, will not prevent unambiguous readings.

After the disc 20 reading has been received, the remote transmitter exciter will reverse the polarity of the customer lines 12*a* and 12*b* so that the lamp 28 will be energized through conductor 73, resistor R10 and diode D3. The oscillators 61 and 80 are energized through diodes D2 and D3 while diode D2 prevents energization of the lamp 27. As a result, a reading may be taken on the position of the disc 21. Here again, certain of the photocells 48, 48*a*, 48*b* and 48*c* may be illuminated in accordance with the position of the disc 21 so that certain ones of the capacitors C1 and C2 may be connected in parallel with the capacitor C5 and certain ones of the capacitors C3 and C4 may be connected in parallel with the capacitor C10. This will again provide a pair of signals in accordance with the reading of the disc 21 to the customer lines 12*a* and 12*b* which is received by the interrogator 15.

Because the disc 21 makes 16 steps for each step of the disc 20, a total of 256 steps of the meter 12 is possible for each encoder register cycle. If meter readings of a greater number of steps per cycle are desired, the discs 20 and 21 may be made with a greater number of code units 30 and 31, or an additional set of discs, lamps and sensor units may be provided.

It will be appreciated that the capacitive incrementing circuits 59 and 78 allow miniaturization in the encoder 10 and transmitter 13 so that the positions of both discs 20 and 21 may be read through two pairs of conductors 65 and 67 and 82 and 83. It will also be appreciated that additional discs could also be read through conductors 65 and 67 and 82 and 83 by providing further selectively operable lamps and/or additional photocells or capacitive incrementing circuits 59 and 78 so that additional tone signals will be produced.

Also, the use of the capacitive incrementing circuits consisting of capacitors C1, C2, C3 and C4 which are switched through photocells 48, 48*a*, 48*b* and 48*c*, respectively, allows the addition and subtraction of discrete values of capacitance without the use of expensive switching devices. This further facilitates the compactness and economies of the encoder 10.

It will be appreciated that use of two modulators and multiplexing the two outputs permits smaller incrementive circuit elements for any given number of position indications to be transmitted. Using the 16-position disc as an example, 16 different frequencies requiring 15 frequency and corresponding capacitive increments would be required for a single oscillator. The required capacitor values which would give a 16-digit, 4-bit binary code would be, for example, 1nf, 2nf, 4nf and 8nf. The 4-bit binary code using these capacitor values would range from 0 to 15nf in 1nf increments. In contrast, where two oscillators are used and the two multiplexed frequencies indicate each of the 16 disc positions, only a two bit binary code for each oscillator is required. Each oscillator produces only four frequencies and only three frequency and corresponding capactitive increments are necessary. Capacitor values analogous to the single oscillator would be 1nf and 2nf and capacitors of 4nf and 8nf would be unnecessary. This, of course, permits elimination of the larger, more expensive capacitors.

Use of two modulators and multiplexing the two outputs also permits transmitting coded information within a narrower bandwidth than that required with a single modulator. The reason is that less incremental frequency and circuit element steps are required. Referring again to the table illustrated in FIG. 5, the Increments are 0.39 percent, 0.78 percent and 1.17 percent of the reference frequency using capacitive increments of 1nf, 2nf and 3nf. Thus, the frequency bandwidth from the reference frequency to 1.17 percent of reference frequency is considerably narrower than that required for the above state 15 frequency increments of a single oscillator. The narrow bandwidth is particularly advantageous where it is desired to connect a number of transmitters to a telephone communication facility in which limited tone channel bandwidths are availble.

Also, a smaller number of incremental steps permits each incrementing capacitor to comprise a relatively large percentage of the total capacitive increment. For example, where the total increment is 15nf in 1nf steps, each increment step would be on the order of 1/15 of the total. But where the total increment is 3nf in 1nf steps, each increment step is on the order of one-third of the total. This advantage allows larger capacitor accuracy allowances and thus less expensive capacitors.

While in the preferred embodiment of the instant invention switching of the capacitors C1, C2, C3 and C4 is performed by the photocells 48–48*c*, it will be appreciated that this switching function could be performed by other devices as well. In addition, it is not necessary that a capacitive incrementing circuit be employed to modify the tone signal output of an oscillator, but an incrementing circuit which modifies other impendances, such as inductances, could also be employed to modify and output tone signal of an oscillator. It should also be appreciated that a separate photocell may be separately positioned adjacent an encoding disc and connected to switch the same impedance. This would permit the positioning of two or more discs apart from each other.

Accordingly, while only a single embodiment of the invention has been shown and described, it is not intended to be limited thereby, but only by the scope of the appended claims.

I claim:

1. A meter reading system having an encoder adapted to be connected to a meter to be read and movable to a plurality of coded positions in response to meter movement, and a transmitter connected to and controlled by the encoder for transmitting an ouput signal over telephone lines, said transmitter comprising a signal means responsive to the position of the encoder to produce a unique output signal for each of said plurality of positions, said signal means comprising:

a first oscillator having a plurality of selectable output frequencies, a second oscillator having a plurality of selectable output frequencies, a means for transmitting the two output frequencies to produce the output signal, and a means for controlling the output frequencies in response to the positions to the encoder to produce a unique combination of a first oscillator frequency and a second oscillator frequency for each position of the encoder.

2. A system according to claim 1 wherein said encoder comprises a disc rotatable to a plurality of positions and having selected opaque and transparent portions in a track on the disc correlated to said plurality of positions, a light source on one side of the disc, and photosensitive resistances positioned on the other side of the disc to selectively receive light through transparent portions of said disc.

3. A system according to claim 2 wherein said photosensitive resistances are respectively connected to each of the oscillators to control the output frequencies of each of said oscillators.

4. A system according to claim 3 wherein said output signal is produced in two sequential parts with one part produced by operating the oscillators with the light source turned off and with the other part produced by operating said oscillators with the light source turned on.

5. A system according to claim 1 wherein said oscillators each have a base frequency and said output signal is produced in two sequential parts with one part produced by operating the oscillators at the base frequencies and with the other part produced by operating said oscillators at the frequencies occurring in response to the positions of the encoder.

6. A meter reading system having an encoder adapted to be connected to a meter for indicating the meter position and a transmitter for producing an output signal comprising:

a coding means having a selected number of positions for producing a unique indication of each of said positions, a first means responsive to the indications of the coding means for producing a signal having a first number of levels, and a second means responsive to the indications of the coding means for producing a signal having a second number of levels with said signals of said first and second means combined to produce the output signal and with said signal levels selected to provide a number of unique outputs equal to the product of the first and second number of levels and equal to the number of positions of the coding means.

7. A system according to claim 6 also comprising a means for controlling the first means and the second means to selectively produce a selected one of said first number of levels and a selected one of said second number of levels for a selected period of time.

8. A system according to claim 6 wherein said coding means comprises a light source, and a plurality of photosensitive resistances selectively exposed to the light source to thereby provide the unique indications.

9. A system according to claim 8 wherein said output signal is produced in two sequential parts with one part produced by operating the first means and second means without illuminating the light source and with the other part produced by operating said first means and second means illuminating said light source.

10. A system according to claim 9 wherein said first and second means are oscillator circuits producing first and second number of frequencies, respectively, and said photosensitive resistances are connected to respectively control the frequencies of said oscillators.

* * * * *